W. W. BAKER AND F. W. FRANKLIN.
SELF CENTERING TOOL HOLDER.
APPLICATION FILED MAY 16, 1919.
1,376,791.
Patented May 3, 1921.
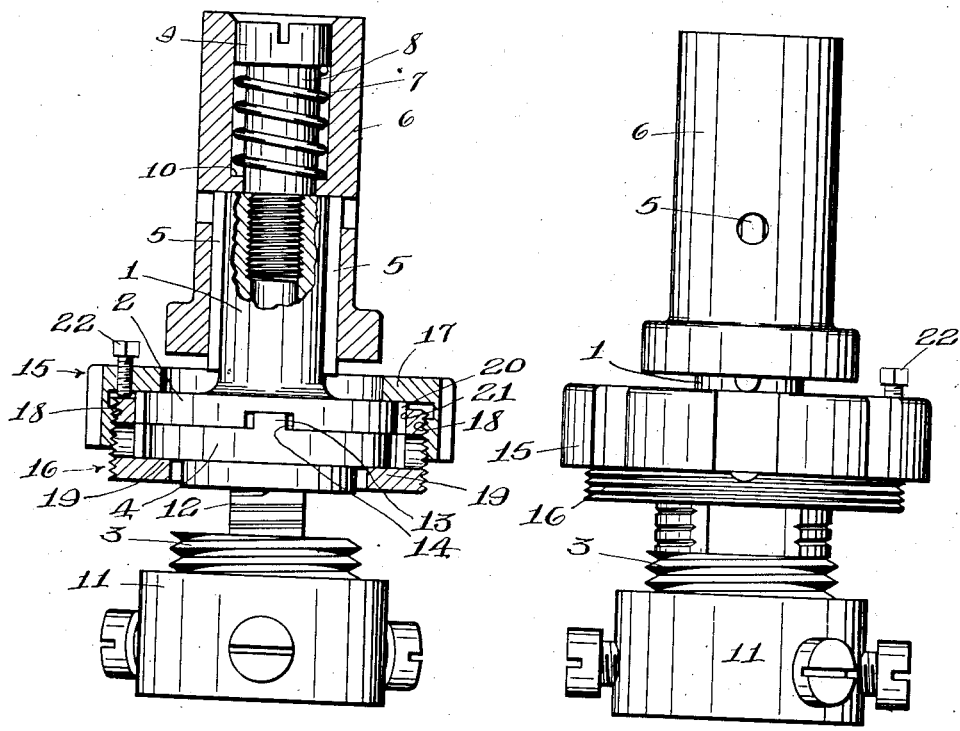
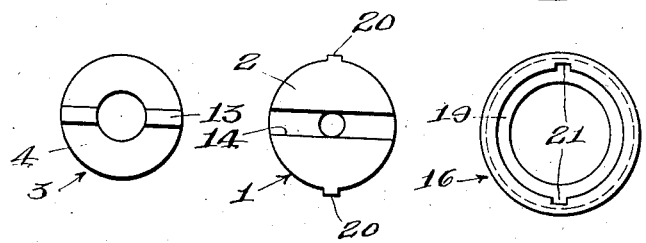
INVENTORS
Walter W. Baker and
BY Frederick W. Franklin
Parsons & Bodell
ATTORNEYS.

UNITED STATES PATENT OFFICE.

WALTER W. BAKER AND FREDERICK W. FRANKLIN, OF SYRACUSE, NEW YORK.

SELF-CENTERING TOOL-HOLDER.

1,376,791.     Specification of Letters Patent.     Patented May 3, 1921.

Application filed May 16, 1919. Serial No. 297,603.

*To all whom it may concern:*

Be it known that we, WALTER W. BAKER and FREDERICK W. FRANKLIN, citizens of the United States, and residents of Syracuse, in the county of Onondaga and State of New York, have invented a certain new and useful self-Centering Tool-Holder, of which the following is a specification.

This invention has for its object a self-centering tool holder especially applicable for centering the tool holding member carrying a tool as a threading die relatively to the rigidly supported work to be threaded which tool holder is particularly simple in construction and highly efficient and durable in use.

In describing this invention reference is had to the accompanying drawings in which like characters designate corresponding parts in all the views.

Figure 1 is an elevation of this tool holder.

Fig. 2 is an elevation, looking to the right or left in Fig. 1, the upper portion being shown partly in section.

Figs. 3 and 4 are opposing face views of the body and the tool holding member.

Fig. 5 is a face view of the collar associated with the tool holding member.

This self-centering tool holder comprises a body, and a tool holding member arranged end to end, the body and said member being formed with interlocking means which transmits the rotation of the body to said member but which permits the body and said member to have relative centering radial movement, and means for coupling the body and said member together, the coupling means being operable to rigidly unite the body and the tool holding member after said member has centered itself.

1 designates the body which is in the form of a shank having a head 2 at one end.

3 is the tool holding member which has a threaded shank having a head 4 at one end opposed to the head 2. The shank of the body 1 is here shown as slidably keyed by keys 5 in a sleeve 6 by means of which the body is mounted in a chuck or similar device.

A spring 7 located within the upper part of the sleeve encircles an extension 8 of the body and presses upwardly on a head 9 on the extension and downwardly on an internal annular shoulder 10 on the sleeve. The extension 8 is here shown as a screw threading into the upper end of the body. The spring permits yielding of the tool holder as it is fed toward the work.

The shank of the tool holding member 3 is hollow or tubular and is externally threaded to receive an internally threaded die holder 11 in which is held a die for cutting threads. The member 3 may however, hold any other tool.

The upper part of the shank of the tool holding member 3 above the threaded portion on which the die holder 11 is mounted, is cut away as at 12 to permit chips, etc., to work out.

The head 2 of the body and the head 4 of the tool holding member are in this form of our invention shown as formed respectively with interfitting radial tongues 13 and grooves 14 on their opposing faces, which, when coupling means to be described, is not tightened up, permit the tool holding member to shift radially and center itself. After it centers, the coupling means may be tightened.

The coupling means includes collars 15, 16 associated respectively with the heads 2 and 4, one collar threading into the other. The collar 15 associated with the head 2 is formed with an internal annular flange 17 which bears against the outer face of the head 2, and with internal threads 18: and the collar 16 is formed with an internal flange 19 bearing against the rear face of the head 2, is peripherally threaded, and turns in the collar 15.

One of these collars is provided with means for interlocking with the part on which the other collar is located, in order to rotate with said part, and, as here shown, the collar 16 is interlocked with the head 2 by peripheral shoulders 20 on the head 2 which enter internal notches 21 in the collar 16.

Sometimes the center of the work being operated on is out of alinement with the axis of rotation of the body 1 and hence it is necessary to permit the tool holding member to have a centering or radial movement during the entire operation. Therefore to prevent the collars 15, 16, from tightening during the operation, one or more stops are provided for holding the collar 16 from threading into the collar 15 to its full extent. These stops as here shown, comprise screws 22 threading through the flange 17 of the collar 15 and having their inner ends opposed to the upper edge of the collar 16.

In operation, the collar 15 can be loosened to permit the tool holding member 3 to shift radially while rotating and to center itself, and if the center of the work is true with the axis of the body 1, the collar 15 is tightened to its full amount. If the center of the work is not true with the center of the body the stop screws 22 are turned inwardly to prevent unintentional tightening of the collars 15, 16 so that the tool holding member 3 may at all times adjust itself to the center of the work.

What we claim is:

1. A self-centering tool holder comprising a body, and a tool holding member arranged end to end, the body and said member being formed with interlocking means to transmit the rotary movement of the body to said member and permit relative centering radial movement of the body and said member and coupling means between the body and said member comprising complementally threaded collars associated respectively with the body and the said member, one of said collars having means for interlocking with the part on which the other collar is mounted to rotate with said part, substantially as and for the purpose described.

2. A self-centering tool holder comprising a body, and a tool holding member arranged end to end, the body and said member being formed with complemental radial tongues and grooves on their opposing faces, to transmit the rotary movement of the body to said member and permit relative centering radial movement of the body and said member, and coupling means between the body and said member comprising complementally threaded collars associated respectively with the body and said member, one of the collars having means interlocking with the part on which the other collar is mounted, to rotate with said part, substantially as and for the purpose specified.

3. A self-centering tool holder comprising a body, and a tool holding member arranged end to end, the body and said member being formed with interlocking means to transmit the rotary movement of the body to said member and permit relative centering radial movement of the body and said member and coupling means between the body and said member comprising complementally threaded collars associated respectively with the body and the said member, and one of the collars having an adjustable stop for limiting the threading movement of one collar into the other, substantially as and for the purpose set forth.

4. A self-centering tool holder comprising a body, and a tool holding member arranged end to end, the body and said member being formed with complemental radial tongues and grooves on their opposing faces, to transmit the rotary movement of the body to said member and permit relative centering radial movement of the body and said member, and coupling means between the body and said member comprising complementally threaded collars associated respectively with the body, and said member, the body and the collar associated with the tool holding member having respectively interlocking tongues and notches, substantially as and for the purpose described.

5. A self-centering tool holder comprising a body, and a tool holding member arranged end to end, the body and said member being formed with complemental radial tongues and grooves on their opposing faces, to transmit the rotary movement of the body to said member and permit relative centering radial movement of the body and said member, and coupling means between the body and said member comprising complementally threaded collars associated respectively with the body, and said member, the body and the collar associated with the tool holding member having respectively interlocking tongues and notches, and the collar associated with the body having an adjustable stop for limiting the threading movement of the other collar thereinto, substantially as and for the purpose specified.

In testimony whereof we have hereunto signed our names at Syracuse, in the county of Onondaga, and State of New York, this 28th day of April, 1919.

WALTER W. BAKER.
FREDERICK W. FRANKLIN.